(12) United States Patent
Lacaze et al.

(10) Patent No.: US 7,321,835 B2
(45) Date of Patent: Jan. 22, 2008

(54) METHOD FOR IMPROVING THE MODE OF OPERATION OF A MATRIX CONVERTER

(75) Inventors: Alain Lacaze, Essert (FR); Thierry Lecomte, Offemont (FR); Joerg Oesterheld, Birmenstorf (CH); Massimiliano Visintin, Zurich (CH)

(73) Assignee: Alstom Technology Ltd, Baden (CH)

( * ) Notice: Subject to any disclaimer, the term of this patent is extended or adjusted under 35 U.S.C. 154(b) by 0 days.

(21) Appl. No.: 11/095,388

(22) Filed: Mar. 31, 2005

(65) Prior Publication Data
US 2005/0219874 A1 Oct. 6, 2005

(30) Foreign Application Priority Data
Mar. 31, 2004 (DE) .................... 10 2004 016 463

(51) Int. Cl.
*G01R 19/00* (2006.01)
*H02M 5/32* (2006.01)
(52) U.S. Cl. ........................................ 702/64; 363/174
(58) Field of Classification Search ................. 702/64, 702/72, 76; 363/152, 157, 159–160, 163, 363/170, 174–176; 318/244, 727, 800
See application file for complete search history.

(56) References Cited

U.S. PATENT DOCUMENTS

| | | | | |
|---|---|---|---|---|
| 4,969,080 A | * | 11/1990 | Kawabata et al. | 363/44 |
| 5,594,636 A | | 1/1997 | Schauder | 363/160 |
| 5,909,367 A | * | 6/1999 | Change | 363/163 |
| 5,949,672 A | * | 9/1999 | Bernet | 363/159 |

(Continued)

FOREIGN PATENT DOCUMENTS

EP 1 199 794 4/2002

OTHER PUBLICATIONS

Turri et al., Matrix Converter With Natural Commutation, Apr. 16-18, 2002, Power Electronics, Machines and Drives, Conference Publication No. 487, pp. 183-188.*

(Continued)

*Primary Examiner*—John Barlow
*Assistant Examiner*—Toan M. Le
(74) *Attorney, Agent, or Firm*—Darby & Darby (57) ABSTRACT

A method for operating a matrix converter in which m phases of a generator generating alternating voltage with n (n<m) phases of a load are alternatingly connected via a multiple number of controllable bi-directional switches arranged in an (m×n) matrix, wherein switching over from a selected connected phase of the generator to a selected non-connected phase of the generator takes place in a controlled sequence of commutation instants of the individual switches. While being able to use low commutation frequencies and correspondingly low commutation losses adapted, improved target voltage curves or target spectra of the generated alternating voltage can be obtained by (1) calculating the output spectrum of the matrix converter based on the connectivity of the phases, on the phase relationship between input and output, and on the instants when commutations of the switches are initiated and/or on the instants when commutations of the switches are completed, by (2) assessing the influence of individual commutations or groups of commutations based on calculated deviation output spectra for deviated individual commutations or groups of commutations, and by (3) amending the sequence of commutation instants to the target voltage curve or target spectrum using the information of these calculated deviation output spectra.

20 Claims, 7 Drawing Sheets

U.S. PATENT DOCUMENTS

| | | | | |
|---|---|---|---|---|
| 6,519,170 | B2* | 2/2003 | Lacaze et al. | 363/152 |
| 6,704,215 | B2* | 3/2004 | Simon | 363/159 |
| 6,711,038 | B2* | 3/2004 | Ziegler et al. | 363/123 |
| 6,744,650 | B2* | 6/2004 | Mahlein et al. | 363/149 |
| 6,826,065 | B2* | 11/2004 | Chekhet et al. | 363/159 |
| 2002/0093840 | A1 | 7/2002 | Lacaze et al. | 363/152 |

OTHER PUBLICATIONS

Miliani et al., Experimental Control of Matrix Converter for Active Generator, 2004 35th Annual IEEE Power Electronics Specialists Conference, pp. 2899-2904.*

Turri et al., De-Synchronized Generator Using a Synchronous Turbo-Generator and a Matrix Converter, Jun. 1-4, 2003, Electric Machines and Drives Conference, ICEMS 2003, Sixth International Conference, vol. 1, pp. 60-66.*

N. Mohan et al., "Power Electronics", $2^{nd}$ Edition, John Wiley & Sons, New York, pp. 11-12, Oct. 1995.

Domenico Casadei et al. "A General Approach for the Analysis of the Input Power Quality in Matrix Converters", Power Electronics Specialists Conference, 1996, vol. 2, pp. 1128-1134.

Stefan Mueller et al. "New Time-Discrete Modulation Scheme for Matrix Converters", IEEE Transactions on Industrial Electronics, vol. 52, No. 6, Dec. 2005, pp. 1607-1615.

Stefan Mueller et al. "New Modulation Strategy for a Matrix Converter with a Very Small Mains Filter", Power Electronics Specialist Conference, 2003, vol. 3, pp. 1275-1280.

* cited by examiner

METHOD FOR IMPROVING THE MODE OF OPERATION OF A MATRIX CONVERTER

Priority is claimed to German Patent Application No. DE 10 2004 016 463.0, filed on Mar. 31, 2004, the entire disclosure of which is incorporated by reference herein.

The present invention relates to the field of power electronics and in particular to power generation with a synchronous generator which is operated above the synchronous mains frequency, as well as the drive of variable-speed synchronous motors and induction motors.

The invention relates more specifically to a method for operating a matrix converter in which m phases of a generator generating alternating voltage with n (n<m) phases of a load are alternatingly connected via a multiple number of controllable bi-directional switches arranged in an (m×n) matrix, wherein switching over from a selected connected phase of the generator to a selected non-connected phase of the generator takes place in a controlled sequence of commutation instants of the individual switches.

BACKGROUND

In power generation, at a specified output, an increase of the rotary speed of a turbine is associated with a decrease in size and costs. Efficiency, too, can be improved. Already, power generation turbines up to 70 MW are connected to generators by way of gearing arrangements, so as to allow operation at higher rotary speeds. As the output increases, the use of gearing arrangements becomes increasingly difficult for safety reasons. In such cases, the turbine is operated at synchronous speed.

The use of a gearing arrangement is associated with a number of disadvantages, such as a fixed transmission ratio, a noise level above 100 dB for 40 MW, and above 115 dB for 70 MW, mechanical losses irrespective of the particular load, and exacting requirements with regard to cooling and lubrication with oil.

The use of static frequency converters (power electronics) represents an alternative. Among others, the following advantages could be expected: reduced costs of the generator in agreement with a constant product of volume and rotational speed, a standardised generator for both 50 and 60 Hz, an adjustable speed which allows restoration of the partial-load efficiency of the turbine, reduced losses in relation to the gearing arrangement (at least in partial load), no upper limit of the possible output, and use of the generator as a starter motor (in the case of gas turbine applications).

Both in the case of power generation and in the case of drives, a reduction in losses of the static frequency converters would bring about substantial cost savings. A reduction of the losses would above all have a bearing on investment costs because cooling accounts for a substantial part of the total costs of the converter.

Static frequency converters exist both with indirect AC/DC/AC conversion and with direct AC/AC conversion.

The indirect conversion (AC/DC/AC) is caused by generating a directed direct current or a directed direct voltage from the three-phase source (mains in the case of motors; generator in the case of power generation). Subsequently, the direct current or the direct voltage is converted back to an alternating current by means of an inverter.

An inductance (current converter) or a capacitor bank (voltage converter) are switched into the intermediate circuit so as to reduce the ripple component of the current or the spikes.

These days, converters make use of thyristors. If natural commutation of the thyristors is possible, the losses in the converter are reduced. However, induction motors for example, take up reactive power. In order to make this reactive power from the net available, it should be possible to switch off the current in a specified arm of the converter at any desired time. In this case there is forced commutation and thus there are increased losses.

Voltage converters use GTOs with their inherent high switching losses, as well as IGBTs or IGCTs. The power of the individual components is less than that of thyristors, consequently, a larger number of components are required for a specified voltage or a specified current.

Direct conversion (AC/AC) is for example possible by means of a so-called cyclo-converter. Direct conversion provides significant advantages from the point of view of the electrical machine, because the current is more or less a sine-shaped wave rather than chopped direct current. It reduces the losses which occur additionally within the electrical machine and it also prevents pulsating torques.

However, the use of cyclo-converters limits the achievable frequency range to 0-⅓ of the input frequency. Due to imbalanced operation, exceeding the ⅓ limit results in overdimensioning up to a factor of 3.

Another possibility of direct conversion is provided by a so-called matrix converter in which each phase of a multi-phase source (generator or mains) is connected or connectable with each phase of a multi-phase load (mains, passive load, motors, etc.) by a bi-directional switch (see e.g. N. Mohan et al., Power Electronics, 2nd Edition, John Wiley & Sons, New York pp 11-12). The switches consist of an adequate number of thyristors to withstand the differential voltage between the phases, and the phase currents, and to allow current reversal. They can be regarded as truly bi-directional components with the options of jointly using additional wiring such as snubbers or the power supplies for the drive pulses for the antiparallel components.

The switches are arranged in an (m×n)-matrix at m phases of the source and n phases of the load. This provides the option of establishing any desired connections between the input phases and the output phases; however at the same time it has the disadvantage in that certain switching states of the matrix must not be allowed since otherwise for example a short circuit would result. Furthermore it is desirable to carry out commutation from one phase to another phase such that the lowest possible switching losses result.

U.S. Pat. No. 5,594,636 describes a matrix converter and a process for its operation in which commutation between the phases is partly carried out as a natural commutation, with a forced commutation where natural commutation is not possible. Although with this type of selection, switching losses are reduced due to natural commutation, those switching losses which arise from forced commutation still remain. Furthermore, the possible forced commutation necessitates the use, in all positions on the matrix, of components which can be switched off. This considerably increases the switching expenditure.

EP-A-1 199 794 describes a matrix converter as well as a method for operating such a matrix converter wherein the essence of the disclosure consists of allowing commutation from one phase to another phase only if such commutation can be carried out as a natural commutation, and of stating a condition for it which can be expressed in a simple way in easily measurable quantities of the matrix converter, and can therefore be easily verified. It therefore takes benefit of a very low commutation frequency, combined with natural commutations, to drastically reduce the commutation loss power. The purpose of the proposed matrix converter is actually to improve the overall efficiency. However, a low commutation frequency usually results in a heavy harmonic distortion, which also holds true for the matrix converter as disclosed in EP-A-1 199 794.

SUMMARY OF THE INVENTION

An object of the present invention is to provide an improved method for operating a matrix converter in which m phases of a generator generating alternating voltage with n (n<m) phases of a load are alternatingly connected via a multiple number of controllable bi-directional switches arranged in an (m×n) matrix, wherein switching over from a selected connected phase of the generator to a selected non-connected phase of the generator takes place in a controlled sequence of commutation instants of the individual switches.

The present invention provides a method for operating a matrix converter, wherein: (1) for the generation of a target voltage curve or target spectrum of the generated alternating voltage, the output spectrum of the matrix converter is calculated based on the connectivity of the phases, on the phase relationship between input and output, and on the instants when commutations of the switches are initiated and/or on the instants when commutations of the switches are completed, (2) the influence of individual commutations or groups of commutations is assessed based on calculated deviation output spectra for deviated individual commutations or groups of commutations, (3) and the sequence of commutation instants is amended to the target voltage curve or target spectrum using the information of these calculated deviation output spectra.

The present invention provides a method for operating a matrix converter in which m phases of a generator generating alternating voltage with n (n<m) phases of a load are alternatingly connected via a multiple number of controllable bi-directional switches arranged in an (m×n) matrix, wherein switching over from a selected connected phase of the generator to a selected non-connected phase of the generator takes place in a controlled sequence of commutation instants of the individual switches. The present invention also provides uses for such a method and a computer program for implementing the method.

One feature of the present invention is that the voltage spectrum can surprisingly easily be calculated based on an estimate of the electromotive forces acting in the system, and that this computational method allows a quick and detailed assessment of the influence of individual commutations of individual switches. It therefore provides the possibility to improve the sequence of commutation instants, which is a highly multivariate process, without too much computational effort. To this end, small variations of the commutation scheme, which e.g. reside in varying the commutation instant(s) of one particular switch or of one particular group of switches, are used to determine the influence of these deviations from the commutation scheme on the output spectrum, and in particular on specific harmonic contributions to the output spectrum. In analogy to the determination of gradients in a multivariate system, this method strongly simplifies the optimisation or adaptation process in a systematic manner and allows tailor-made output spectra without the necessity of providing additional hardware. Target output spectra can for example be designed to have a reduced amount of undesired harmonic contributions (harmonic distortion reduction), they can have a lower voltage at a specific frequency (reduced voltage generation), they can be designed to have specific contributions at specific frequencies (prescribed voltage generation).

According to a first preferred embodiment of the method, the calculation of the output spectrum is additionally based on the input voltage and/or on the input current thus allowing the calculation of absolute numbers and not only a normalized output spectrum. Since for as low commutation losses as possible it is desirable use as many natural commutations as possible, according to another preferred embodiment, limitations due to desired natural commutation processes can be taken into account when amending the sequence of commutation instants.

A particularly simple and efficient use of the proposed method is possible when spectra of the electromotive force spectra (EMF) are calculated as the calculated output spectrum and as the calculated deviation output spectrum. These electromotive force spectra can be calculated based on little information and be allowed to correlate very well with the voltage and the current spectrum.

According to another preferred embodiment, to make sure that all arising frequency components are taken into account, the calculation of the calculated as well as of the calculated deviation output spectra is carried out for at least one real period of repetition of the switching cycle of the converter.

Since at least partly harmonic distortions are due to non-ideal switching behaviour, i.e. due to delays between the initiation of the switch off of a switch to be disconnected and the effective completion of the commutation by way of switching on of the subsequently connected switch, to take those commutation delays as realistically into account improves the usefulness of the calculated spectra. Therefore, preferentially, according to another embodiment, the instants when the commutations of the switches are initiated and in particular when the commutations are effectively completed are determined by monitoring and/or measuring the individual switches in the converter. In other words, not the theoretical values as programmed in their corresponding control programme but rather the effective and actual values of what is going on in the converter is used as the parameters for the calculations.

The proposed method can in particular be applied to a matrix converter the input of which is provided via a star connection, preferentially via a star connection the star point of which is not grounded or grounded through a large impedance. If the matrix converter is to be operated as a motor, preferably such a star point is not grounded.

According to another preferred embodiment of the method, an iterative optimisation or adaptation process is used for the generation of the target voltage spectrum. Therefore, the steps as described above are iterated in that the output spectrum of the sequence of commutation instants as defined in step (3) is calculated, in that the influence of individual commutations or groups of commutations is assessed based on calculated deviation output spectra, and in that the sequence of commutation instants is further improved based on these deviation output spectra. The number of iterations can be in the range of 2-5, as not unusual in such multivariate surroundings. It is advantageous to periodically update this calculation and, if need be, periodically adjust the commutation scheme based on these updates. This due to the fact that normally during operation of such a converter, changes in the system, the load, and the grid are common influencing the mode of operation of the converter.

Generally, during operation the conditions of the turbine driving the generator but also the conditions of the load, i.e.

normally the grid are prone to changements. Since all those changing conditions are influencing also the converter, periodically adapting and optimising the commutation scheme of the converter based on the proposed method proves to be useful. Therefore, preferentially, during operation of the converter the steps of the proposed method are periodically carried out to take changing external conditions of the system into account and to thereby reduce harmonic distortions generated due to these changing external conditions.

According to still another preferred embodiment of the method, it is applied to a matrix converter which is characterised in that n phases of the generator are always connected with the load while (m-n) phases of the generator are not connected with the load, wherein switching over from a selected connected phase of the generator to a selected non-connected phase of the generator only takes place if the condition $$I_k \cdot (V_k - V_l) \cdot K_{ijkl} < 0$$

is met, where $I_k$ and $V_k$ is the current and the voltage of the selected connected phase, $V_l$ is the voltage of the selected non-connected phase and in each instance $K_{ijkl}$ is a characteristic constant for the mutual inductance between the phases of the generator and the inductance of the load. In other words, the method according to the present invention can be advantageously applied to a matrix converter as disclosed in EP-A-1 199 794, the disclosure of which document shall be included into this disclosure with respect to the particular way of design of commutation sequence. The switching state of the switches, the connection state of the phases of the generator, and the signs of the currents in the phases of the generator, and the differential voltages between the phases of the generator, can be monitored or measured. At specified preferably periodic points in time switch-over is allowed to occur. For switch-over, one or several phases of the generator are selected, which phases of the generator according to the information gained from monitoring or from measuring, are not connected and fulfil the condition. It is possible to use antiparallel thyristors as bi-directional switches.

Furthermore, the present invention relates to a use of a method as described above wherein preferably the commutation sequence is iteratively adapted based on the calculated electromotive force spectrum in particular for the reduction of unwanted harmonic components of the frequency spectrum.

The present invention additionally relates to a computer program product for controlling the commutation sequence of a matrix converter in which m phases of a generator generating alternating voltage with n (n<m) phases of a load are alternatingly connected via a multiple number of controllable bi-directional switches arranged in an (m×n) matrix, wherein switching over from a selected connected phase of the generator to a selected non-connected phase of the generator takes place in a controlled sequence of commutation instants of the individual switches. The computer program product is characterized in that (1) for the generation of a target voltage curve or target spectrum of the generated alternating voltage, the output spectrum of the matrix converter is calculated based on the connectivity of the phases, on the phase relationship between input and output, and on the instants when commutations of the switches are initiated and/or on the instants when commutations of the switches are completed, (2) in that the influence of individual commutations or groups of commutations is assessed based on calculated deviation output spectra for deviated individual commutations or groups of commutations, (3) and in that the sequence of commutation instants is amended to the target voltage curve or to the target spectrum using the information of these calculated deviation output spectra.

Further embodiments of the present invention are outlined in the dependent claims.

SHORT DESCRIPTION OF THE FIGURES

In the accompanying drawings preferred embodiments of the invention are shown in which.

DETAILED DESCRIPTION OF THE PREFERRED EMBODIMENTS

Figure 1A:
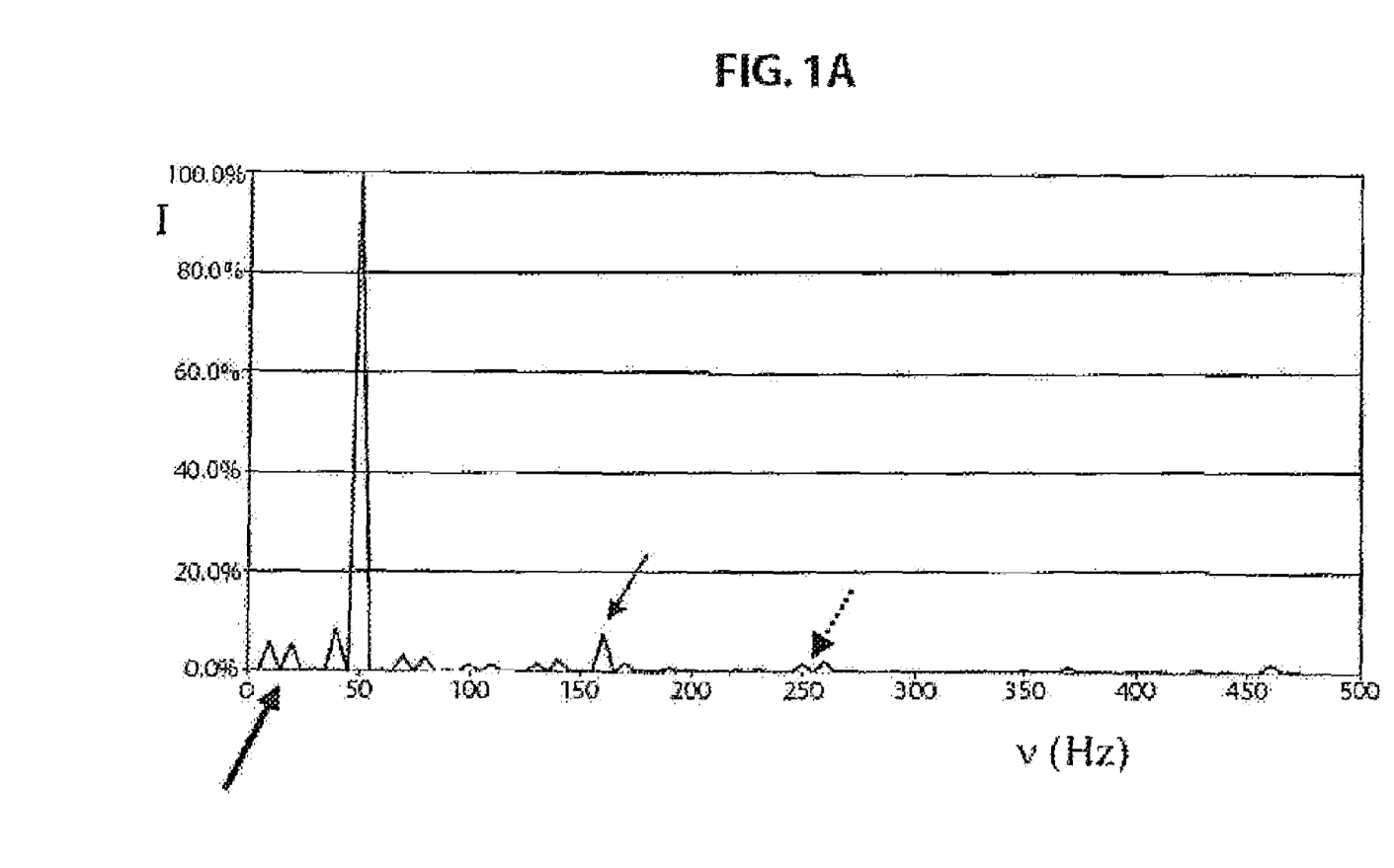
FIG. 1a) displays a spectrum of a matrix converter according to the state-of-the-art, wherein the intensity of the output current is displayed as a function of the frequency; b) displays a spectrum of a matrix converter with an improved characteristic using the proposed method for harmonic distortion reduction.

Referring to the drawings, which are for the purpose of illustrating the present preferred embodiments of the invention and not for the purpose of limiting the same, FIG. 1a) shows the output current spectrum of a naturally commuted matrix converter as disclosed in EP-A-1 199 794. The essence of this disclosure consists of allowing commutation from one phase to another phase only if such commutation can be carried out as a natural commutation, and of stating a condition for it which can be expressed in a simple way in easily measurable quantities of the matrix converter, and can therefore be easily verified. The matrix converter is operated such that m phases of a generator generating alternating voltage with n (n<m) phases of a load are alternatingly connected via a multiple number of controllable bi-directional switches arranged in an (m×n) matrix, whereby n phases of the generator are always connected with the load while (m-n) phases of the generator are not connected with the load. EP-A-1 199 794 furthermore specifies that switching over from a selected connected phase of the generator to a selected non-connected phase of the generator only takes place if the condition $$I_k \cdot (V_k - V_l) \cdot K_{ijkl} < 0$$

is met, where $I_k$ and $V_k$ is the current and the voltage of the selected connected phase, $V_l$ is the voltage of the selected non-connected phase and in each instance $K_{ijkl}$ is a characteristic constant for the mutual inductance between the phases of the generator and the inductance of the load. The disclosure of EP-A-1 199 794 is explicitly included with respect to the present preferred embodiments, i.e. the method according to the present invention is applied to a matrix converter according to EP-A-1 199 794 and represent improvements of said matrix converter or its method of operation.

The matrix converter described in EP-A-1 199 794 takes benefit of a very low commutation frequency, combined with natural commutations, to drastically reduce the commutation loss power. The purpose is actually to improve the overall efficiency. A low commutation frequency however usually results in a heavy harmonic distortion. This can easily be seen from FIG. 1a), which shows the output current spectrum of such a matrix converter. It can clearly be seen that not only there is substantial frequency components below operating frequency of the generator (50 Hertz), in particular at 20 and 40 Hertz, but also above, a for example at 160 Hertz. The spectrum plot in FIG. 1a) shows frequencies which are not integer multiples of the fundamental output frequency (50 Hz). Sub-harmonics (lower than the fundamental at 50 Hz) are also visible, in particular at 10, 20 and 40 Hz. This will produce torque oscillations, and will result in a heavy thermal load on the rotor iron and rotor damper.

The purpose here is to report on a method to use predicted spectra to:
- generate additional voltages inside the converter to improve the output spectrum
- or to generate reduced voltage
- or to generate a prescribed voltage output.

The method takes benefit of the mentioned matrix converter specific architecture without any additional hardware. It takes also full benefit of the predictability of the spectrum of this converter.

The method is based on a theoretical prediction of the output spectrum. The voltage and the current spectrum as well as indirectly the power spectrum of a matrix converter in general all depend on the effective electromotive force and on the effective impedance on each harmonic. These impedances and electromotive forces strongly depend on the frequency, on the whole circuit and on the specific commutation sequence.

Generally, one can say, that the voltage (V) and the current (I) spectrum are cumbersome to predict. Quite on the contrary, the effective electromotive force can be predicted from a limited number of information, namely the electromotive force spectrum is computed without any voltage, current or impedance being known. The only information which is used relates to the commutation instants.

Therefore the relative amplitudes of the electromotive force acting on each harmonic can be predicted from simple, easy to obtain information which is:
- Which phases were connected
- The instants when commutation started
- The instants when commutations were completed
- The initial value of the phase relationship between input and output.

If no information on the amplitude of the input voltage is available, only a normalized spectrum can be assessed. This is sufficient, because one only needs the normalized amplitude and phases, but not the absolute ones.

Since for the harmonic distortions among other reasons the delay between the instant a certain switch is initiated to turn off and the instant the next switch effectively takes over and connects another branch of the matrix converter is relevant, taking the effective conditions of this switching (duration of commutation) as realistically into account as possible is important. Therefore for the calculation the following scheme is used:

1. Determine the real period of repetition of the full commutation cycle. Subsequently any calculation will have to be carried out for at least one such real period to make sure all frequency components are effectively taken account of.
2. Identify when the individual switches are turned on and turned off within the commutation cycle. These parameters (on/off of each switch) should not only be determined theoretically (by means of the commutation scheme programmed and controlled by a control software), but as they actually take place, i.e. the instants when switches are effectively turned on and/or off are monitored and measured, and these measured instants are taken for the calculation of the EMF spectrum.
3. Calculate the EMF spectrum based on the connectivity of the phases, on the phase relationship between input and output, and on the instants when commutations of individual switches are initiated (off, measured/monitored) and on the instants when commutations of individual switches are completed (on, measured/monitored), wherein such calculation is carried out for at least one real period of repetition of the switching cycle Since there is a delay (actual duration of commutation) between the moment $t_1$, when phase a is disconnected via a switch $g_1$ ($g_1$ turns off) and the moment $t_2$, when the next phase b is connected via another switch $g_2$ ($g_2$ turns on), the behaviour during this delay is taken account of in the calculation by using an average linear value. This average value is determined by the amplitude of the respective phases when switched on/off, respectively, and the amplitude of the crossing of the two phases. I.e. during the actual duration of commutation a linear behaviour of the amplitude is used, including the amplitude of the crossing of a and b and with a slope given by the difference of the amplitude of a at $t_1$ and of b at $t_2$.

From an initial prediction, one can check the influence of each individual commutation on the spectrum. Limitations due to the natural commutation process can be assessed and taken into account.

Several means can be used to predefine the request for modifications of the commutation instants:
- Target voltage curve
- Voltage vector or electromotive force analysis
- Sensitivity matrix of harmonics versus commutation instants The common feature is that a software mean is used to define the effective electromotive force on each individual harmonic, to predefine the best commutation instants, and to produce a new request or sequence for the commutations instants.

The method works with a star connected inlet, preferably with the star point not grounded or grounded through a large impedance to be able to develop a substantial voltage with respect to the network (outlet) neutral.

Another specificity of the method is that it works with rather low commutation frequencies, whereas generally the commutation frequency is increased to reduce harmonic distortion.

Figure 1B:
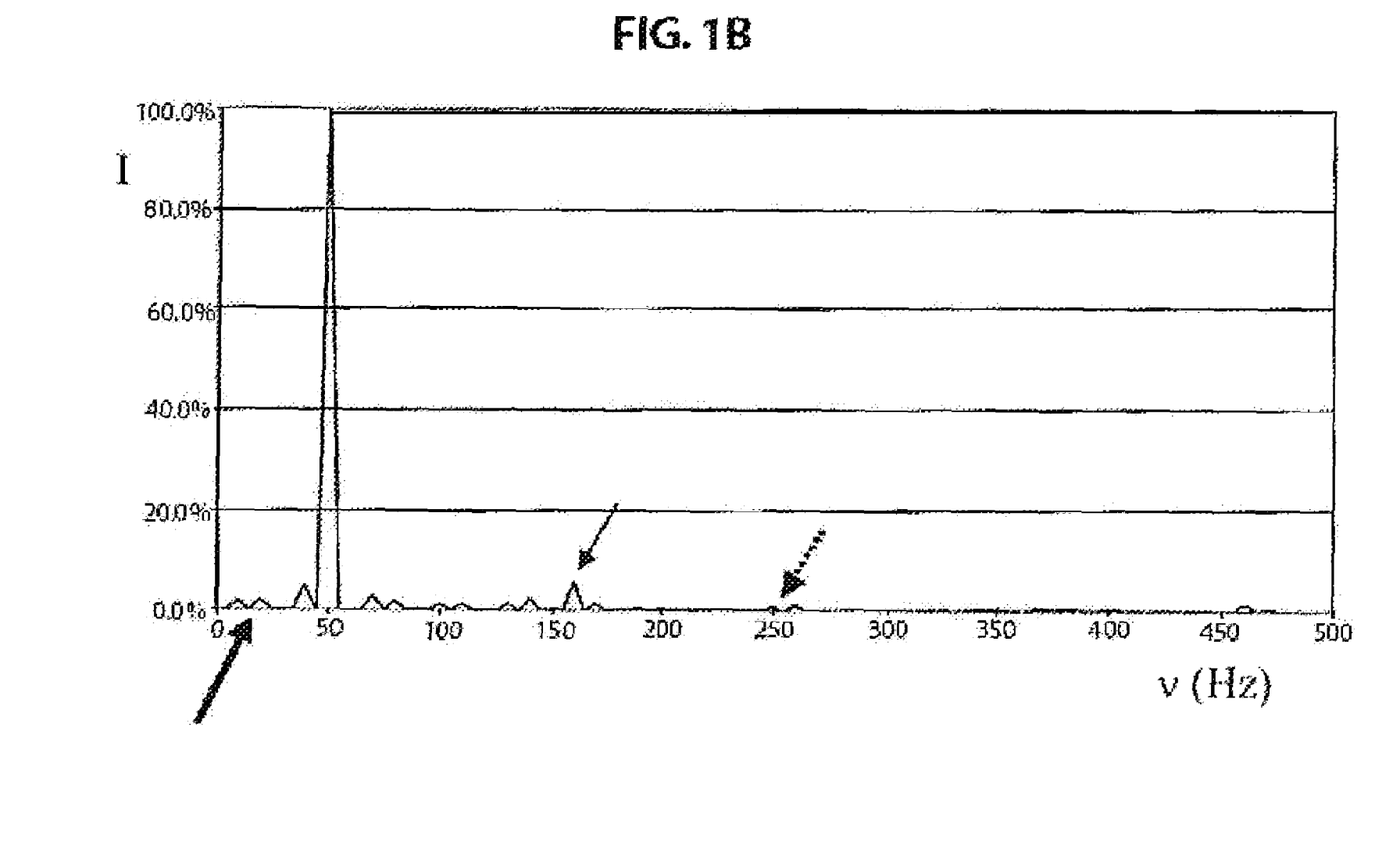

The example of FIG. 1b) shows the improvement in output currents obtained using the proposed method. Mainly the 10, 20 and 40 Hz current harmonics are reduced (see arrows). Some improvement is also obtained on 160, 250, 260 Hz.

Figure 2A:
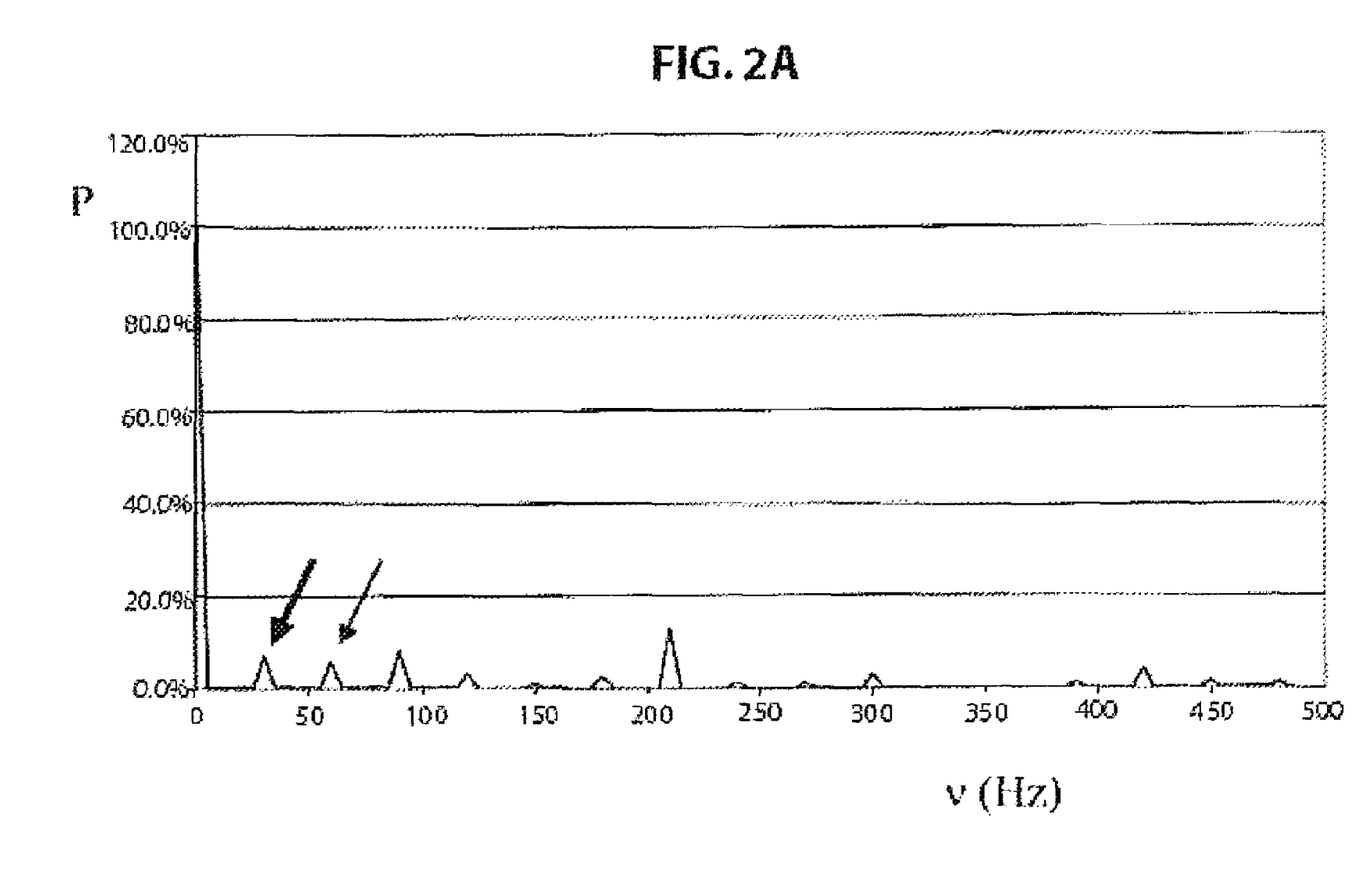
FIG. 2a) displays a power spectrum corresponding to FIG. 1a); b) displays a power spectrum corresponding to FIG. 1b)
Figure 2B:
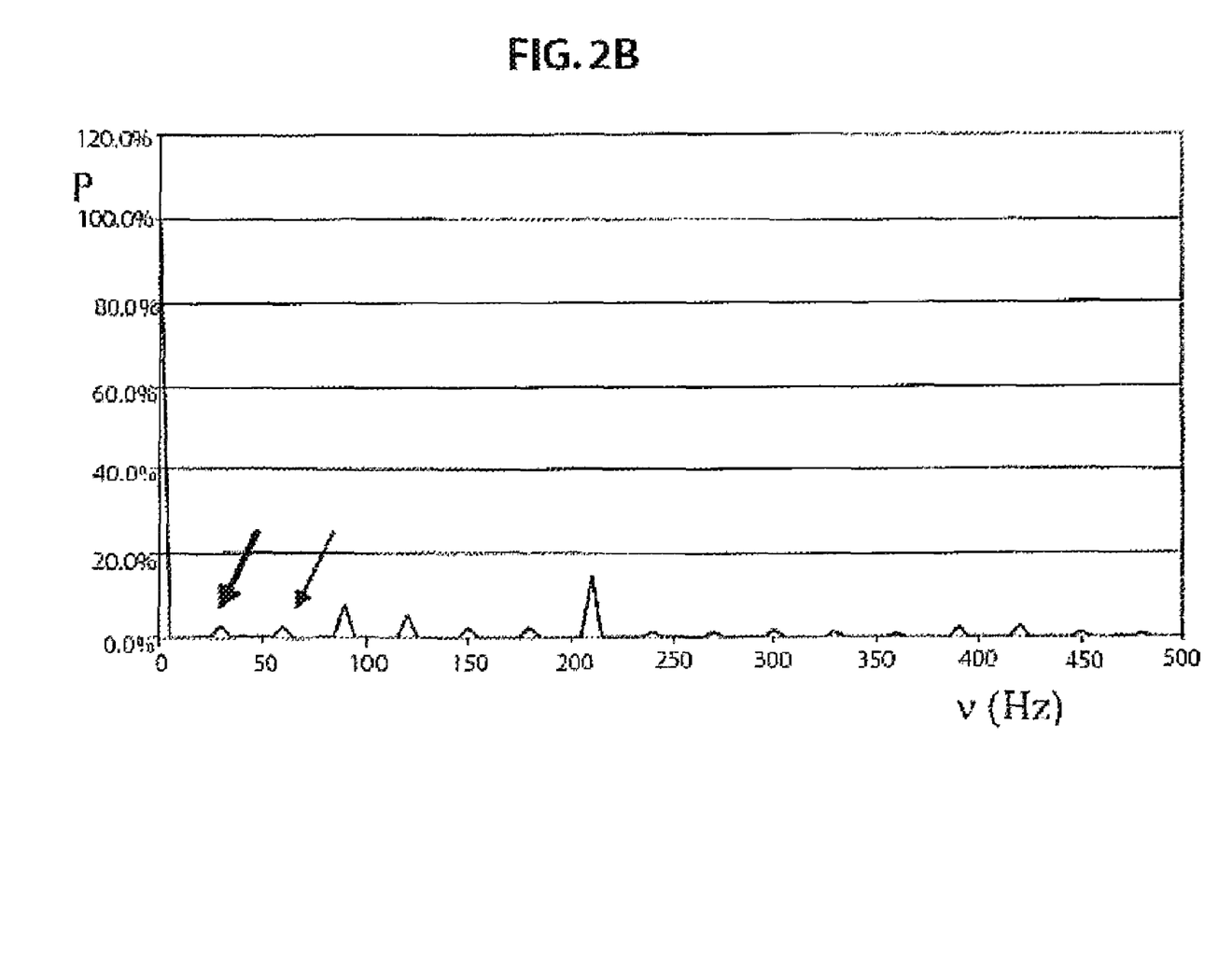

In FIG. 2 one can furthermore see that the corresponding power spectrum is also improved, denoting that the inlet is also protected against harmonic distortion in the same process. Here the 30 and 60 Hz component were improved.

Another means to reduce harmonic distortion is to superimpose voltages on converter outlet.

Figure 3:
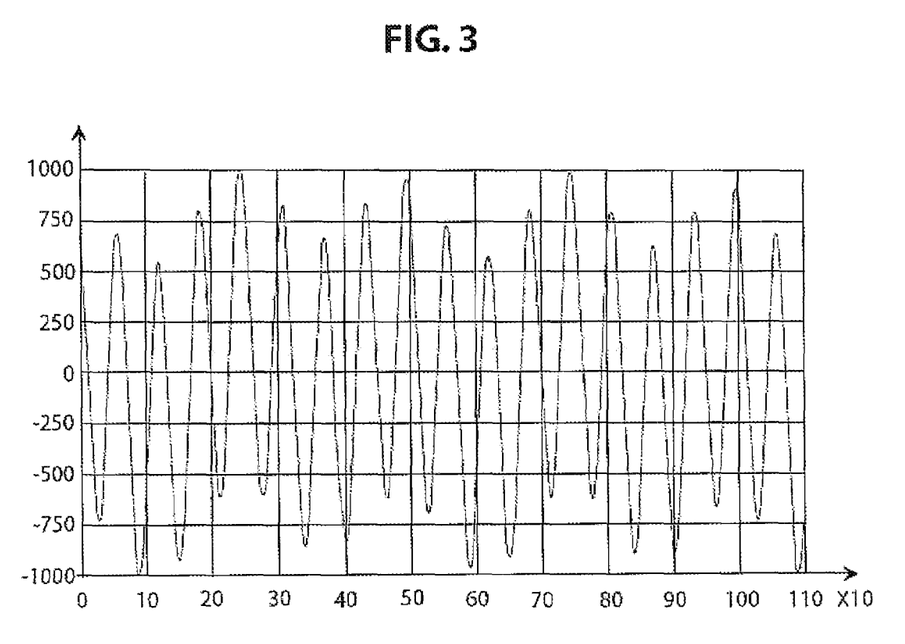
FIG. 3 displays an example of a prescribed voltage as a function of time.
Figure 4:
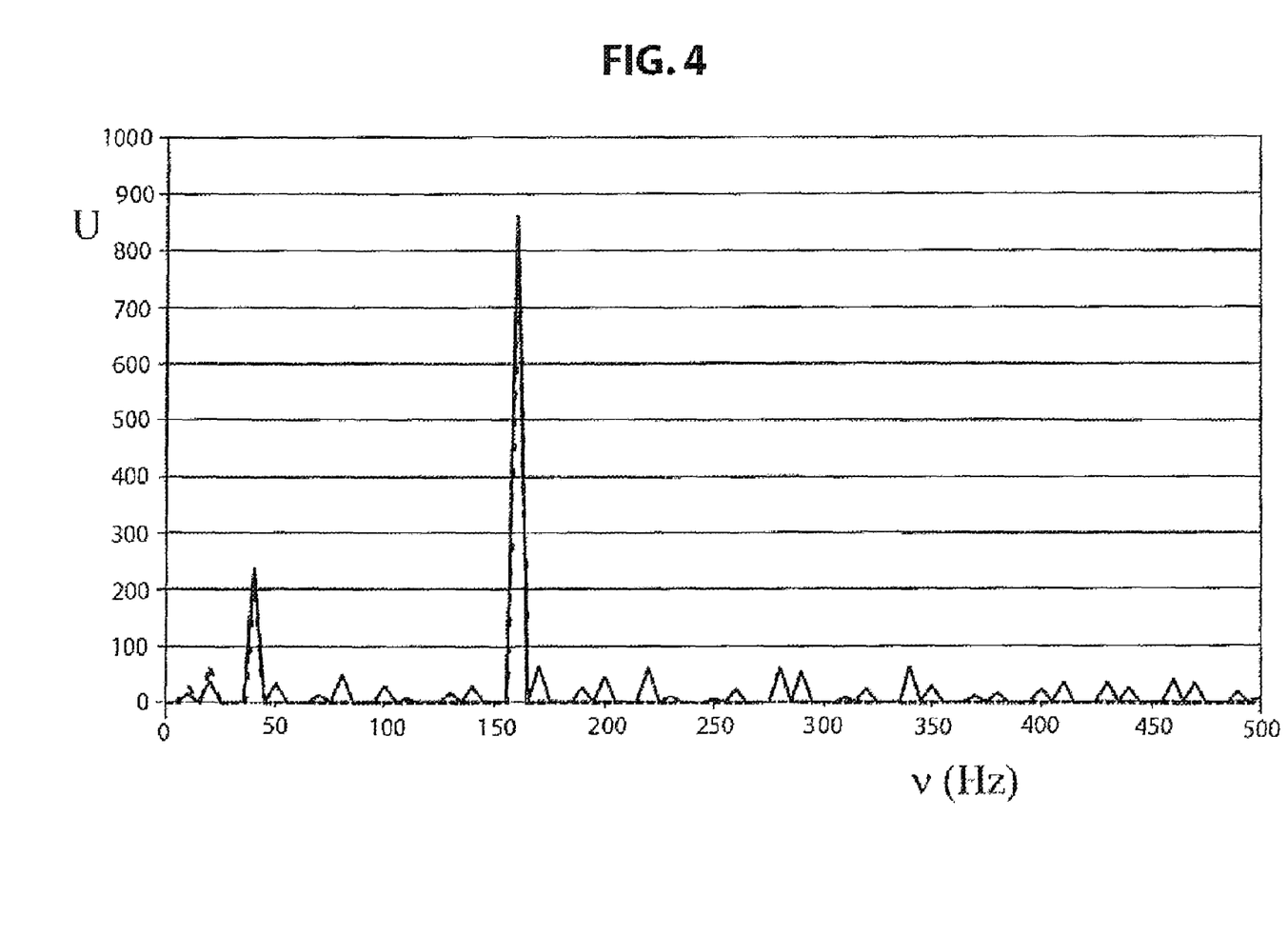
FIG. 4 displays on the one hand the output spectrum of the voltage according to FIG. 3 (dashed line) and on the other hand the resulting voltage spectrum (solid line) as determined using the method according to the invention.

The proposed method can not only be used for the reduction of harmonic distortions as shown above, but also for the generation of a prescribed voltage as a function of time. FIG. 3 shows an example of a desired or requested voltage. FIG. 4 shows the fit between voltage spectrum as requested (dashed line) and voltage resulting from the commutation instants definition after adaptation (solid line). The commutation frequency is still in the range of 200 commutations per seconds.

Figure 5:
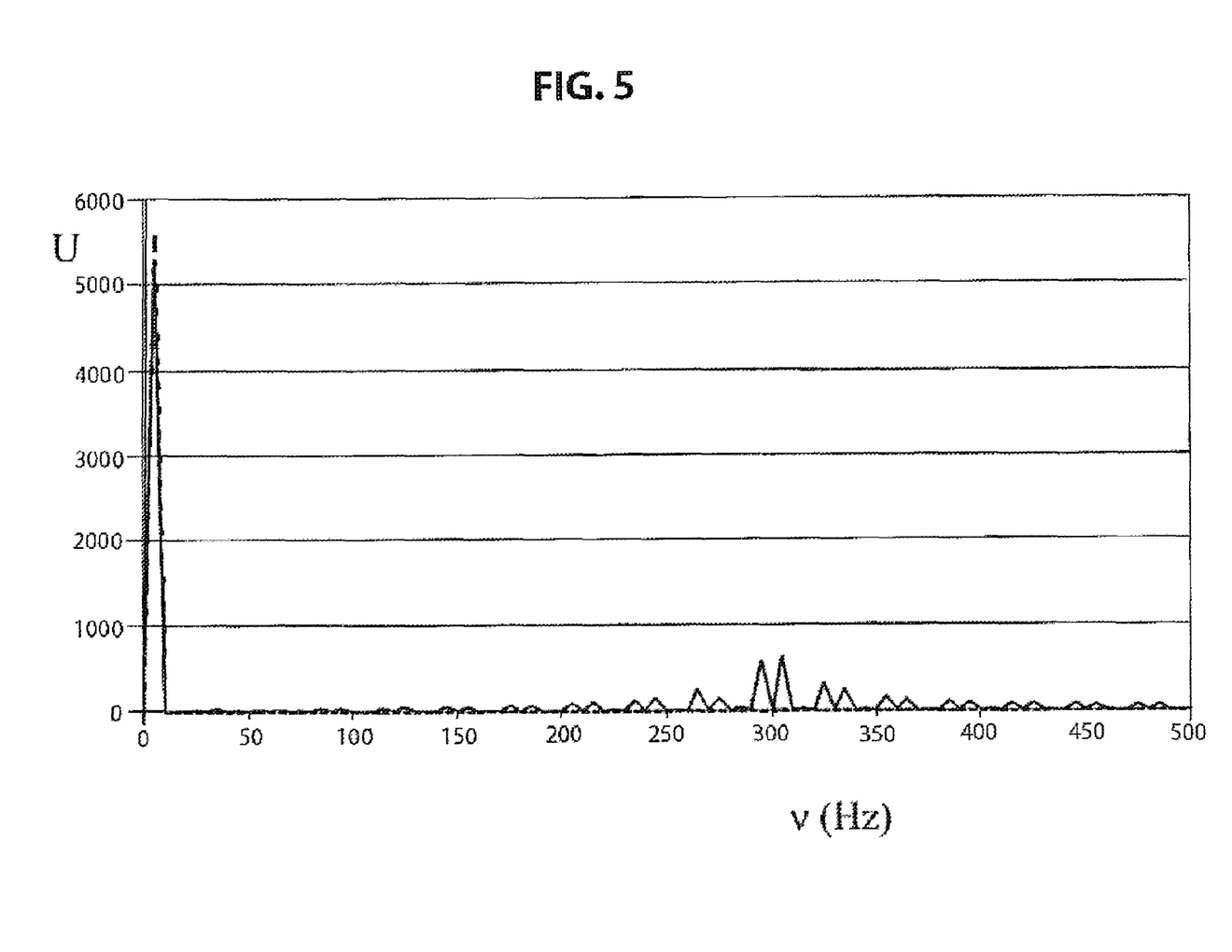
FIG. 5 displays a spectrum of a desired reduced voltage generation, wherein the dashed line indicates the target voltage and the solid line the output spectrum after adaptation of the commutation sequence.

Furthermore, the method according to the invention can be used for generating a reduced voltage. In the example of FIG. 5, the generator electromotive force is 10 000 volts at 50 Hz, whereas the converter output is only 5500 volts, at 5 Hz. The commutation frequency is increased only by 20% with respect to the normal sequence.

The specificity of the method can be summarised as follows:
1. The voltage spectrum is intended to be controlled via an estimated electromotive force both for amplitude and phase.
2. A sequence with a controlled spectrum is expected to have a rather low commutation frequency, with therefore low commutation losses.
3. The generator (or inlet) star point is not grounded, or grounded through a large impedance. It can therefore develop a substantial voltage with respect to the network (outlet) neutral.
4. For motor operation, the outlet (motor) star point is not grounded.
5. A software mean is used to predict the output spectrum and to check the influence of individual commutation instants, to best fit to a target spectrum. Standard optimisation protocols can be used for this optimisation.
6. The frequency conversion is performed with a low commutation frequency. For instance in the herein reported application the input frequency is generally 85 Hz, the output frequency is 50 Hz, each thyristor (unidirectional) is turned on about 18 times per second, each outlet phase is switched around 200 time per second.
7. The efficiency of conversion, thanks to the low commutation frequency, is high. Commutation losses remain a small part of overall loss power.

What is claimed is:
1. A method for operating a matrix converter, comprising:
generating alternating voltage with n phases of a load using a generator having m phases, wherein n<m;
alternatingly connecting the m phases of the generator using a plurality of controllable bi-directional switches arranged in an (m×n) matrix;
switching over from a selected connected phase of the generator to a selected non-connected phase of the generator in a controlled sequence of commutation instants of the individual switches;
calculating an output spectrum so as to generate one of a target voltage curve and a target spectrum of the generated alternating voltage, wherein the calculating is based on at least one of a connectivity of the phases, on a phase relationship between input and output, and on instants when commutations of the switches are initiated and when the commutations of the switches are completed;
assessing an influence of individual commutations or groups of commutations based on calculated deviation output spectra for deviated individual commutations or groups of commutations;
amending the sequence of commutation instants to the at least one of the target voltage curve and the target spectrum using the calculated deviation output spectra, wherein the calculating of the output spectra and the deviation output spectra includes calculating the electromotive force spectra (EMF); and
operating the matrix converter according to the amended sequence of commutation instants.

2. The method as recited in claim 1, wherein the calculation of the output spectrum is additionally based on one of an input voltage and an input current.

3. The method as recited in claim 1, wherein the amending the sequence of commutation instants is performed taking into account limitations due to desired natural commutation processes.

4. The method as recited in claim 1, wherein the calculating of the output spectra and the calculated deviation output spectra is performed for at least one real period of repetition of the switching cycle.

5. The method as recited claim 1, wherein the instants when the commutations of the switches are initiated and effectively completed are determined by at least one of monitoring and measuring individual ones of the plurality of controllable bi-directional switches.

6. The method as recited claim 1, further comprising a star connection providing the input of the matrix converter.

7. The method as recited claim 6, wherein the star connection includes a star point that is one of not grounded and grounded through a large impedance.

8. The method as recited in claim 7, wherein for motor operation the star point is not grounded.

9. The method as recited claim 1, further comprising generating a prescribed voltage spectrum using the amended sequence of commutation instants.

10. The method as recited in claim 9, wherein the prescribed voltage spectrum includes at least one of a reduced voltage and a voltage spectrum with reduced harmonic distortion.

11. The method as recited claim 1, further comprising iterating the steps of the method so that the calculating of the output spectrum includes calculating the output spectrum of the sequence of commutation instants as defined in the amending step, so that the assessing of the influence is performed based on calculated deviation output spectra, and so that the amending of the sequence of commutation instants is performed based on the calculated deviation output spectra.

12. The method as recited in claim 1, further comprising periodically repeating the steps of the method during operating of the matrix converter so as to take into account changing external conditions of the matrix converter so as to reduce harmonic distortions generated due to the changing external conditions.

13. The method as recited in claim 1, wherein n phases of the generator are always connected with the load and (m−n) phases of the generator are not connected with the load, wherein a switching over from a selected connected phase of the generator to a selected non-connected phase of the generator only takes place if the condition $$I_k \cdot (V_k - V_l) \cdot K_{ijkl} < 0$$

is met, wherein Ik and Vk is the current and the voltage of the selected connected phase, Vl is the voltage of the selected non-connected phase and in each instance Kijkl is a characteristic constant for a mutual inductance between the phases of the generator and an inductance of the load.

14. The method as recited in claim 13, further comprising at least one of monitoring and measuring a switching state of the switches, a connection state of the phases of the generator, signs of the currents in the phases of the generator, and differential voltages between the phases of the generator; performing a switch-over at specified points in time; and selecting one or more phases of the generator for the switch-over, wherein the one or more phases are selected using information from the at least one of monitoring and measuring, are not connected, and fulfill a predetermined condition.

15. The method as recited in claim 14, wherein the switch-over is performed at periodic points in time.

16. The method as recited in claim 1, wherein the bi-directional switches include antiparallel thyristors.

17. A method for generating one of a target voltage curve and a target spectrum of an alternating voltage generated by a static frequency converter, the method comprising:
  generating the alternating voltage with n phases of a load using a generator having m phases, wherein n<m;
  alternatingly connecting the m phases of the generator using a plurality of controllable bi-directional switches arranged in an (m×n) matrix;
  switching over from a selected connected phase of the generator to a selected non-connected phase of the generator in a controlled sequence of commutation instants of the individual switches;
  calculating an output spectrum so as to generate one of a target voltage curve and a target spectrum of the generated alternating voltage, wherein the calculating is based on at least one of a connectivity of the phases, on a phase relationship between input and output, and on instants when commutations of the switches are initiated and when the commutations of the switches are completed;
  assessing an influence of individual commutations or groups of commutations based on calculated deviation output spectra for deviated individual commutations or groups of commutations;
  amending a sequence of commutation instants to the at least one of the target voltage curve and the target spectrum using the calculated deviation output spectra;
  iteratively adapting the commutation sequence on the basis of a calculated electromotive force spectrum so as to reduce unwanted harmonic components of the frequency spectrum; and
  operating the matrix converter according to the amended sequence of commutation instants.

18. The method as recited in claim 17, wherein the static frequency converter is a matrix converter.

19. A computer readable medium having stored thereon computer executable process steps operative to perform a method for operating a matrix converter, the method comprising:
  generating alternating voltage with n phases of a load using a generator having m phases, wherein n<m;
  alternatingly connecting the in phases of the generator using a plurality of controllable bi-directional switches arranged in an (m×n) matrix;
  switching over from a selected connected phase of the generator to a selected non-connected phase of the generator in a controlled sequence of commutation instants of the individual switches;
  calculating an output spectrum so as to generate one of a target voltage curve and a target spectrum of the generated alternating voltage, wherein the calculating is based on at least one of a connectivity of the phases, on a phase relationship between input and output, and on instants when commutations of the switches are initiated and when the commutations of the switches are completed;
  assessing an influence of individual commutations or groups of commutations based on calculated deviation output spectra for deviated individual commutations or groups of commutations;
  amending a sequence of commutation instants to the at least one of the target voltage curve and the target spectrum using the calculated deviation output spectra, wherein the calculating of the output spectra and the deviation output spectra includes calculating the electromotive force spectra (EMF); and
  operating the matrix converter according to the amended sequence of commutation instants.

20. The computer readable medium as recited in claim 19, wherein the method further includes calculating an electromotive force spectrum and wherein values used as the instants when the commutations of the switches are initiated and effectively completed are determined by at least one of monitoring and measuring individual ones of the plurality of controllable bi-directional switches.

* * * * *